Oct. 7, 1941.  E. E. ROSAIRE ET AL  2,257,859
METHOD AND APPARATUS FOR RECORDING WAVES
Filed March 8, 1937  4 Sheets-Sheet 2
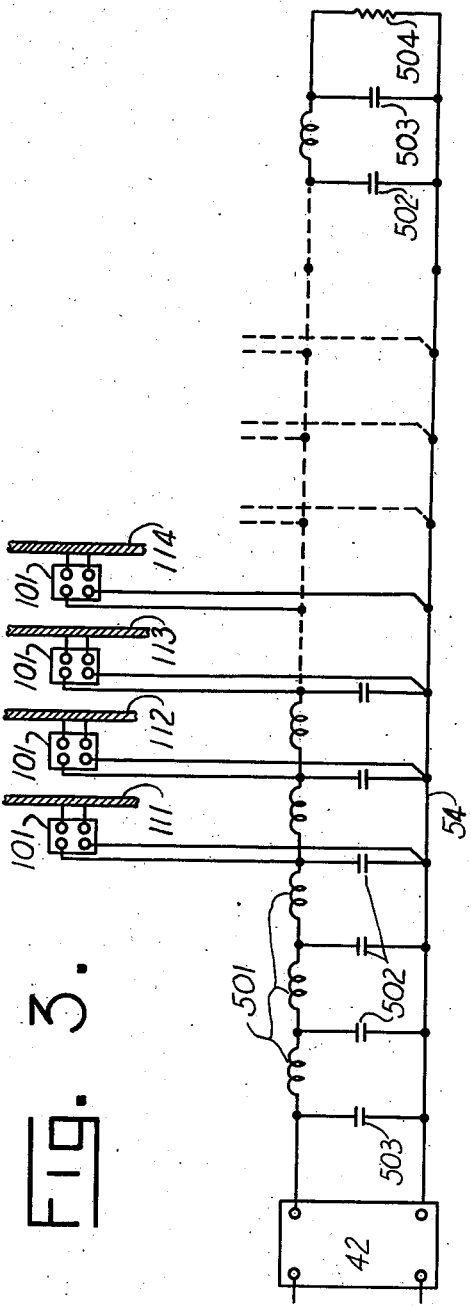
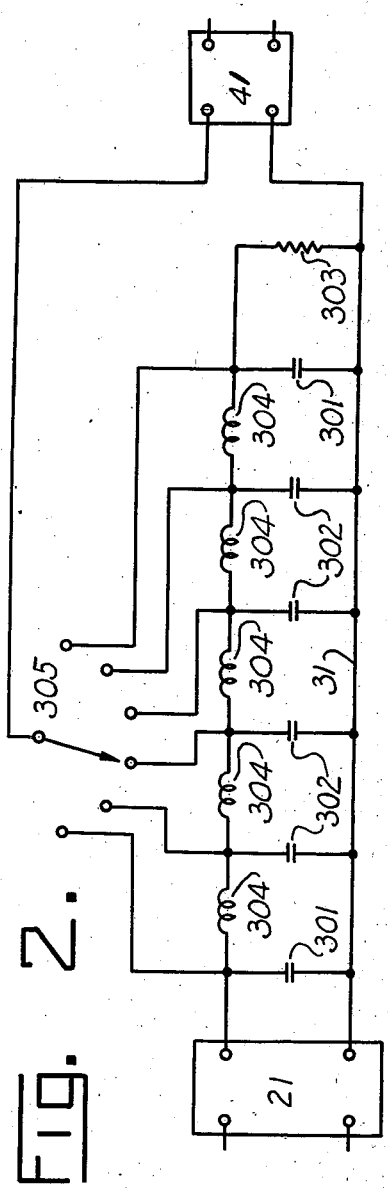
E. E. ROSAIRE
F. M. KANNENSTINE
INVENTORS
BY Jesse R. Stone
& Lester B. Clark
ATTORNEYS Oct. 7, 1941.         E. E. ROSAIRE ET AL         2,257,859
          METHOD AND APPARATUS FOR RECORDING WAVES
               Filed March 8, 1937        4 Sheets-Sheet 3

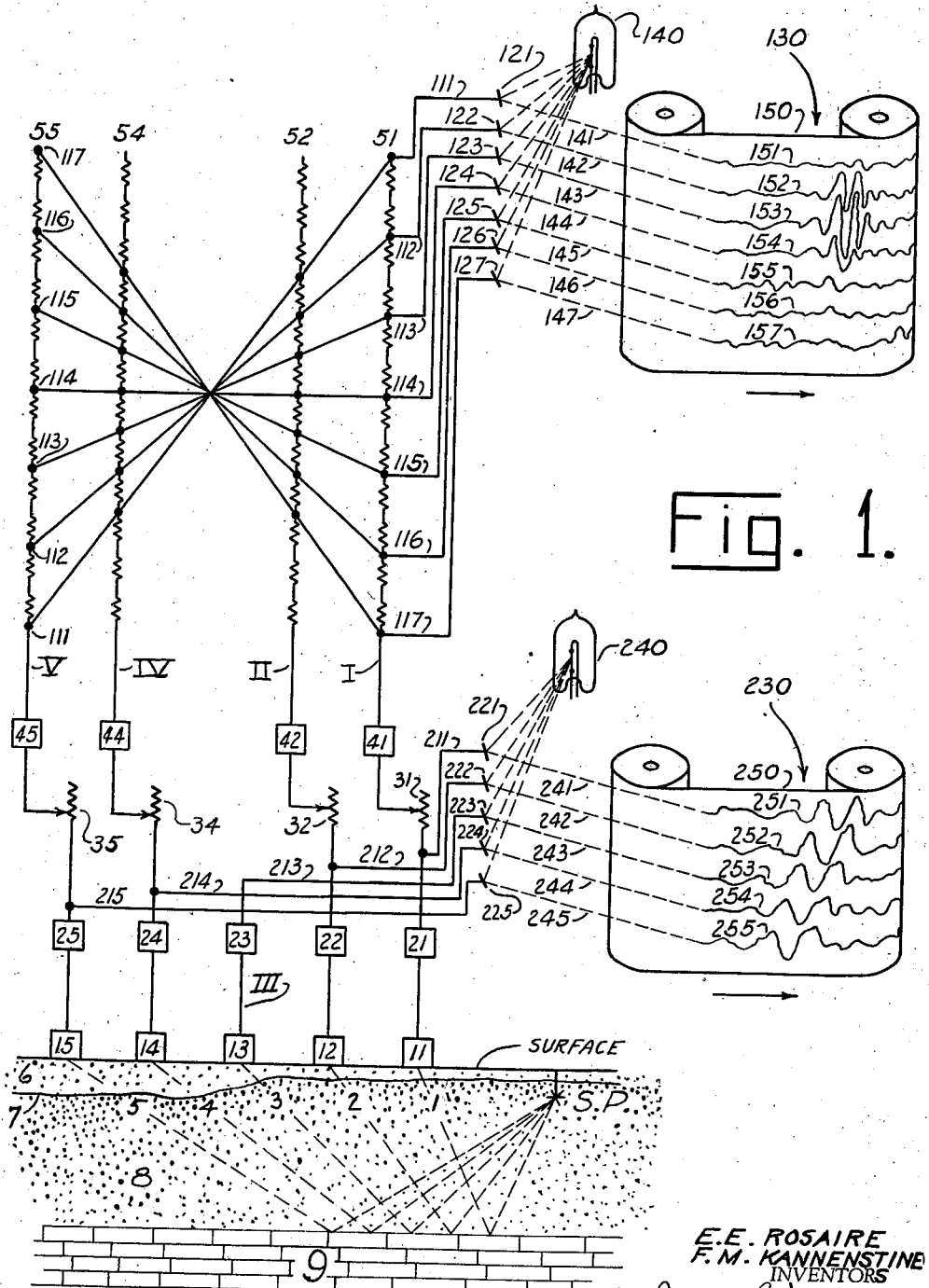

E. E. ROSAIRE
F. M. KANNENSTINE
INVENTORS

BY

ATTORNEYS

Oct. 7, 1941.   E. E. ROSAIRE ET AL   2,257,859
METHOD AND APPARATUS FOR RECORDING WAVES
Filed March 8, 1937   4 Sheets-Sheet 4

E. E. ROSAIRE
F. M. KANNENSTINE
INVENTORS
BY Jesse R. Stone
& Lester B. Clark
ATTORNEYS Patented Oct. 7, 1941

2,257,859

UNITED STATES PATENT OFFICE 2,257,859

METHOD AND APPARATUS FOR RECORDING WAVES

Esme E. Rosaire and Fabian M. Kannenstine, Houston, Tex., assignors, by mesne assignments, to said Rosaire Application March 8, 1937, Serial No. 129,552

9 Claims. (Cl. 181—0.5)

The invention relates to a method and apparatus by which elastic motions of solids, liquids, gases, and the like may be detected, recorded and analyzed in a form more readily, quickly and accurately than in previous methods or apparatus used for this purpose.

The invention has particular application to the art of geophysical exploration in which earth movements are detected, recorded and simultaneously analyzed. The records so obtained may be thereafter interpreted for evidence as to the existence, description and analysis of subsurface formations.

The invention is also applicable as a method of sound ranging whereby the source of distant sounds can be located, for example for the location of enemy gunfire by which counter-battery effectiveness can be increased.

An object of the invention is to record and simultaneously analyze the vibrations set up in the earth as a result of an artificial seismic disturbance.

Another object is to determine the direction from which certain vibrational waves emerge, thereby making it possible to determine the depth and dip of a buried geological formation.

A further object is to provide a method from which analyzed results may be obtained in the field, thus enabling the operator to know the nature of the information obtained so that it may be utilized immediately to determine whether to set off another or a larger charge of explosive, to change the geometry of the geophone array, to move to another location, or to otherwise repeat or review the proceeding.

A further object is to provide a method and apparatus for sound ranging in which sources of sounds can be located, such as enemy gunfire, projectile bursts and the like, and in which the results are made quickly available for effective counter-battery.

Still another object is the provision of a means and method for depth sounding whereby the slope of a sea bottom as well as the depth can be measured. By similar means and method the altitude of an airplane or airship can be found, as well as the slope of the ground beneath such vehicle.

A more specific object is to detect a disturbance at a plurality of points, to translate the vibrations into electrical impulses and to compensate for non-linear geometric arrangement of the points of detection.

A further object is to detect a disturbance at a plurality of points, to translate the vibrations into electrical impulses and to delay and compound said impulses to produce an analyzed record of the disturbance.

Other objects will become apparent from the description of the invention and its method of operation.

A method of dissemination has been described in U. S. Patent 2,051,153, issued on August 18, 1936, to Mr. Frank Rieber. Rieber secures phonographically reproducible records for mechanical analysis. After taking these records in the field, they are later analyzed in the laboratory. In this later analysis it is possible to explore the records for waves with various angles of emergence. This method of recording phonographically reproducible records and later analyzing such records, has been further described in various published papers. For example, "Visual Presentation of Elastic Wave Patterns under Various Structural Conditions," Geophysics, vol. 1, No. 2, July 1936, and "A new Reflection System with Controlled Directional Sensitivity," Geophysics, vol. 1, No. 1, January 1936, are papers describing equipment and method.

However, a material passage of time takes place in the described methods between the time that the phonographically reproducible record is recorded, and the time that the analysis is completed. Thus, particularly since the records secured (variable density sound track records) are not immediately analyzed, it may well be that the records secured might be materially improved if a second shot were fired at a greater depth, if more explosive were used, or if a different shot-recorder geometry were used. Further, the observer records blind; that is, not knowing what his analyzed record would show. He might be securing reflections from a buried structure off to one side, whereas if he knew that at the time, he might re-order his field plans.

It is the purpose of the invention to eliminate these undesirable features associated with the method as practiced in the field, and, by making the analysis of the record apparent to the observer in the field very shortly after the shot has been fired, to secure a better arrangement of field effort.

The invention will now be described in connection with the drawings in which:

Fig. 1 is a diagram showing the general arrangement.

Fig. 2 is a circuit diagram showing the details of the adjustable delay circuits shown schematically in Fig. 1.

Fig. 3 is a diagram showing one of the main delay circuits also shown schematically in Fig. 1.

Fig. 6 shows the arrangement of the invention for sound ranging purposes, the specific example chosen having for its purpose the location of enemy gunfire, the burst of shells and the like.

Figure 5:
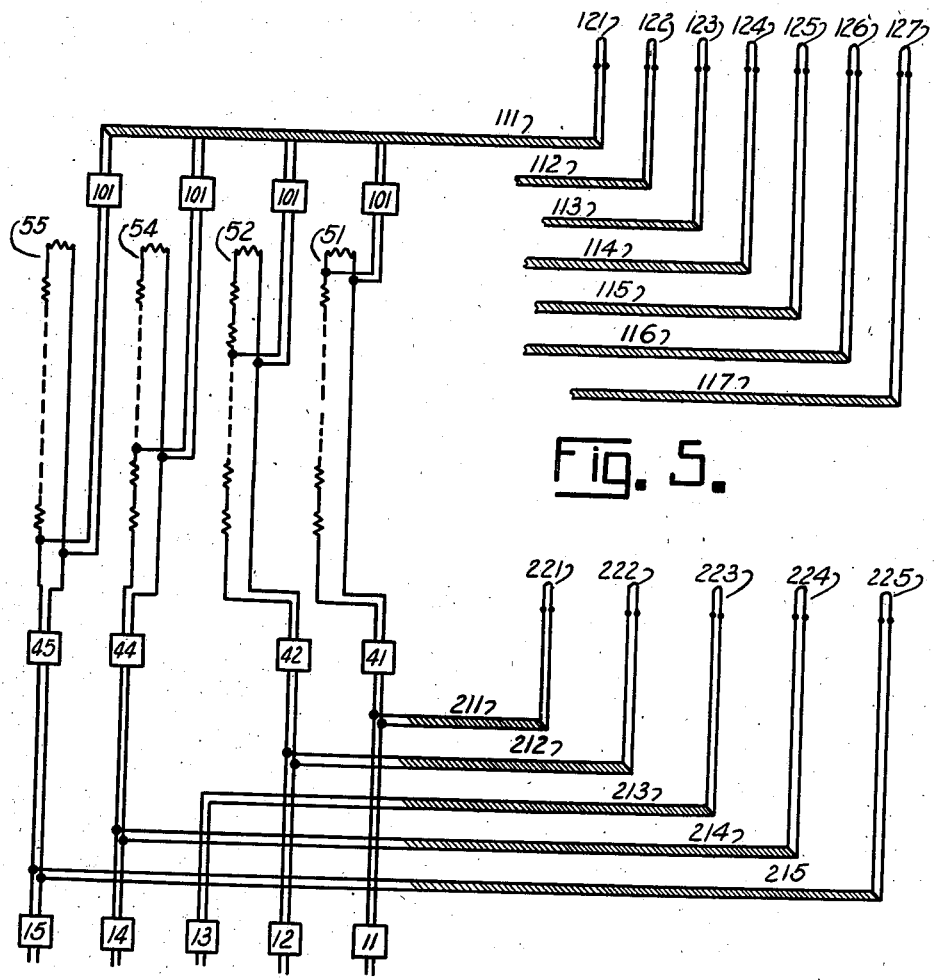
Fig. 5 shows the primary channel leads terminating into the galvanometers of the primary recording oscillograph and the compounding or secondary circuit leads terminating into the galvanometers of the secondary recording oscillograph.

In broad terms the present invention comprehends method and apparatus for locating sources of elastic wave vibrations. In accordance with the invention the wave vibrations, which may be direct, refracted, diffracted or reflected, are detected at a plurality of spaced points and are converted into recordable impulses. These impulses, which occur at different times, are delayed in transmission by varying amounts. By compounding the delayed impulses in the delay circuits a record presenting a plurality of traces is obtained, which record indicates the direction of the source of the detected waves, or in the case of geophysical prospecting, the nature of subsurface structure, modifying the direction of the elastic waves.

By compounding of the delayed impulses is meant the combination of impulses to produce an instantaneous summation of amplitudes such as the algebraic sum of current, voltage or of physical motion.

In Fig. 1, SP is the point at which the seismic disturbance is caused to occur (commonly called the "shot point"), 9 is a buried bed from which sound waves are reflected, 7 is the portion of the earth's crust which overlies bed 9. Sound paths 1 to 5 are the paths followed by the reflected waves in reaching geophones 11 to 15 respectively. These geophones may be of any suitable type known in the art, the only requisite being that they transduce elastic waves into electrical impulses. The geophones are shown on the surface, but of course may be buried to any depth below the surface.

The output from the respective geophones is amplified in amplifiers 21—25, respectively, and is recorded optically on a strip of photosensitized paper 250 in oscillograph 230, using lamp 240, galvanometers 221—225, and reflected light beams 241—245, which constitute optical levers which amplify the angular motion of mirrors 221—225, to produce the latent photo-images 251—255 on moving paper strip 250. This strip, subsequently developed, results in the seismograph record commonly produced in seismic prospecting.

Up to this point, the recording follows established practice. The novelty of this invention lies in the compounding and recording through the delay circuits 31, 32, 34 and 35 and 51, 52, 54 and 55.

From the output of the amplifiers 21—25, the impulses pass into delay circuits 31, 32, 34 and 35 shown in detail in Fig. 2. After being delayed an appropriate length of time the impulses are fed into the unilateral impedances 41, 42, 44 and 45 and from thence into the main delay networks, such as 51, 52, 54 and 55, one of which is shown in detail in Fig. 3.

From the cross compounding lead 111—117, the impulses pass to the galvanometers 121—127 of oscillograph 130 where they are recorded in the usual manner, by means of light beams 141—147 from lamp 140 producing latent photo-images on moving photographic paper 150. When developed, paper 150 becomes an analyzed record.

Amplifiers 21—25 are ordinarily single or multistage vacuum tube amplifiers, well understood in the art of seismic prospecting. These amplifiers normally contain networks which provide frequency discrimination.

The delay circuit 31 is shown in detail in Fig. 2, the remaining circuits such as 32, 34 and 35 being identical therewith. The circuit consists of a series of iterated low pass filter sections, from which output voltage may be picked at several points; this adjustment serves to compensate for local irregularities at individual geophones, commonly known as "weathering" in the art of seismic prospecting. For the purpose of illustrating the use of these delay circuits, Fig. 1 is shown with a section of the earth's crust having a weathered layer 6 of varying thickness, a second layer 8 having a greater degree of compaction than layer 6, the interface between the two layers being indicated as 7, and a bed 9 from which the seismic waves are reflected. The thicker weathered layer under geophones 14 and 15 will cause the waves to arrive at the surface later than they should; this fact is compensated for by the adjustment of delays 34 and 35, shown with the adjustment set for a smaller delay than for circuits 41 and 42.

The amount of weathering for which there must be correction is ordinarily determined by shooting a short refraction profile, after which delays 31—35 may be set for proper compensation.

If the delays 31—35 are placed between amplifiers 21—25, and geophones 11—15, or at any point such that they are between the geophones and the primary recorder 230, then automatic compensation is obtained in the primary record 250 as well as the secondary or analyzed record 150.

The unilateral impedances 41—45 are used to provide a high impedance output for the network 31 so that electric wave reflections due to added admittances between sections are eliminated. In the delay network 31, etc., shown in Fig. 2, 301 is the end half-section capacitance, 302 is the mid full section capacitance, 303 is the matched impedance termination used to prevent termination reflections and avoid standing waves or traveling transients, 304 is the architrive or series inductance, and 305 is the delay adjustment.

The main delay circuits 51, 52, etc., are artificial lines, one of which is illustrated in Fig. 3. Here delay circuit 54 is shown to contain a series of iterated low-pass sections in which 501 is the architrive inductance arm, 502 is the terminal half section pillar or parallel capacitance, 504 is the terminating load impedance serving the same purpose as 303 in Fig. 2 and 101 is a unilateral impedance by means of which voltages of different amounts of delay are picked off for compounding in channels 111, etc.

The chain of circuits through which the impulses pass before compounding will be designated as a primary channel, exemplified by 11, 21, 31, 41, 51 generalized as I or 14, 24, 34, 44, 54 as IV, etc., in Fig. 1. Circuits through which the impulses pass after compounding are referred to as secondary channels, so that path 111, 121—151 would be a secondary channel. It is in the light of these definitions that the terms are used in the specification and claims.

Figure 4:
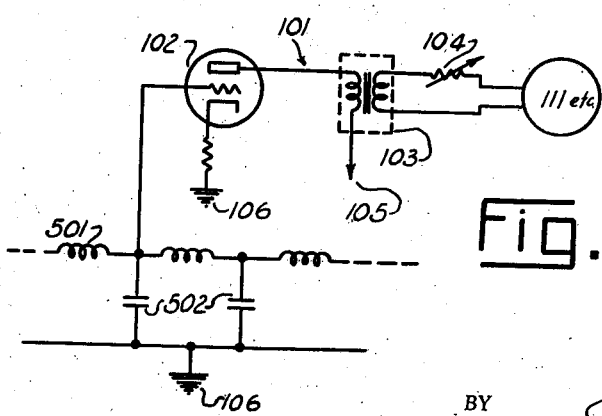
Fig. 4 shows the amplifier network used to connect the main delay circuits to the compounding circuit leads.

The reason for using the unilateral impedances, 101 of Fig. 3, is to present the smallest possible admittance at points along the artificial line, and to prevent feed-back from other delay circuits from setting up spurious impulses in a given delay circuit. Fig. 4 shows unit 101 in detail and shows the method of picking off a voltage from a given point on a delay circuit; several such units feed the common compounding channel 111, several others the next common channel 112, etc. The unit 101 consists of a unilateral impedance and matching network, specifically vacuum tube 102 and power source 105, and the matching transformer 103 and balancing pad 104. One unit such as 101 is used at each delay point on networks 51—55, and several such units are compounded to feed each secondary channel 111—117 as shown in Fig. 5.

Fig. 5 shows the compounding lines 111, etc., terminating in the galvanometers 121, etc., in the oscillograph 130, by means of which galvanometer 121 receives an instantaneous summation or superposition of current or voltage fed into compounding line 111, galvanometer 122 records the superposed amplitude in line 112, etc.

Oscillographs 130 and 230 are preferably arranged especially for seismic prospecting. This type of equipment is well known. Either the moving coil or string galvanometer may be used. Incorporated in each oscillograph should be a device for placing timing marks on the record, this is also well known in the art of seismic prospecting.

Methods of delay are well known in the electrical art. The present invention should be considered to embrace delay means generically including such means as acoustical transmission lines and magnetic means such as the telegraphone.

Obviously, the primary channels must be similar to each other, and the secondary channels must be similar to each other. That is, each component of each primary channel must be similar to each corresponding part of each other primary channel. The geophones 11, 12, etc., all produce some delay of their own which must be held to satisfactory uniformity. If the delay circuits themselves are uniform, then, except for the predetermined adjustments of circuits 31, 32, etc., the primary channels will be similar. It is preferable to maintain this uniformity to a tolerance of less than 0.001 second between similar individual units. Secondary channels must likewise possess uniformity; the unilateral coupling impedances, 101, must be similar and the galvanometers, 151, etc., adjusted to possess the same frequency and phase distortion.

The manner in which the apparatus works is as follows:

Suppose a reflected wave front arrives at the geophones 11—15 such that the crest of the wave arrives at successive geophones at increments of time $t$, the crest would thus arrive at geophone 15 in a time $4t$ seconds later than at geophone 11, and the waves as recorded by oscillograph 230 would show successive wave crests arriving with an increment time $t$ from trace 251 to 252, and $4t$ from trace 251 to 255. From this increment of time, the geometry of the geophone array, and other known quantities, the direction of arrival of the wave, and the depth and dip of bed 2 of Fig. 1 can be computed.

If the delay in circuits 51, 52, etc., is adjusted so that the increment of delay from channel I to channel II is just equal to the increment time $t$, then the compounding will result in a summation of the impulses, in phase, so that the recorded amplitude is large. Thus if two impulses arrive at detectors 11 and 12 at different times, the summation of the two impulses will not be as great as if the impulses arrive simultaneously, but if the impulses are subject to suitable amounts of delay, they may be made to arrive at a point simultaneously so that the summation is a maximum. Thus suppose for example the line 113 connects to such a point that it receives the impulses from detector 11 with one amount of delay and from detector 12 with another amount of delay, the difference in delay being of the same magnitude and opposite sign of the interval of time between the arrival of the impulses at detectors 11 and 12. Then the other lines 111 and 112, and 114 to 117 will pick up impulses which are out of phase and the recording on traces 151, 152 and 154—157 will suffer destructive interference and the recorded amplitude will be small. That is, a maximum amplitude recorded on trace 153 will show a certain angle of arrival of the reflected wave. Each line 151—157 can be considered to represent a certain angle of arrival, and the record 150 can be regarded as an analytical representation of record 250. This accomplishes, in the field, an analysis which has heretofore been possible only in the laboratory, as disclosed in the previously mentioned patent and papers by F. Rieber.

If, on the other hand, the delay circuits 51 etc. are adjusted for increments of delay which are different from the increments of time at which waves arrive in the different channels, then the maximum would occur between a pair of traces such as 153 and 154, but by interpolation, the angle of arrival can be determined with considerable accuracy. This is the normal condition.

The recording mechanism 230 can be omitted, and the invention will still function. The advantage of including this device is that with it the angular resolving power is somewhat greater than that of the analyzed record for many purposes.

Thus, visual analysis of record 250 will occasionally be more accurate in determining direction than the automatic analysis produced in record 150, whereas events ordinarily detectable in 250 will usually show up in the analyzer record 150. That is, the two records furnish more information than either separately.

In the illustrations, 5 pickup channels and 7 analyzer channels are shown; this is for illustration only, and in practice the number of each can profitably be increased. It will be noted that if an odd number of geophones is used with uniform spacing, the center channel contributes nothing to the determination of the dip of the buried structure; a graphical study of this problem, using the method of least squares shows the effect of the middle channel to be zero. Thus, it is preferable in the invention described to use an odd number of geophones, with the channel of the middle one used only for the primary recorder 230; if the analyzer of secondary recorder 130 alone is used without the recorder 230, then an even number of geophones will be preferable with spacing such that the array is that of an odd number with the middle channel omitted. The channel thus saved amounts to from 10% to 20% of the cost of the primary channels involved.

In the design and construction of equipment of the type herein described, engineering principles embracing the matching of impedances, principles of circuit design, and maintenance of suitable standards of component parts must be observed if the apparatus is to function properly. For example, terminations 303 and 504 must match the impedance of the artificial lines if standing or reflected, traveling waves are to be avoided. We mention several such principles in the next few paragraphs.

The delay networks have been illustrated in Figs. 2 and 3 as consisting of a series of iterated constant $k$ low-pass networks. As these networks are subject to considerable reflection phenomena at frequencies near cut-off, it is preferred to design these delay networks to have a cut-off frequency somewhat higher, say about 40% higher, than the highest frequency to be recorded. Then, in the amplifier units 21, 22, etc., is incorporated the low-pass or band-pass filter usually used in exploration equipment; this filter highly attenuates frequency components in the range near the cut-off frequency of the delay circuits so that unwanted terminal reflection phenomena may be held to minimum. Further refinement can be had by terminating the delay networks in derived $m$ half sections to produce better impedance matching over the useful transmission range; such terminal half sections are well known in the art of electrical transmission and are discussed by T. E. Shea in a book "Transmission Networks and Wave Filters," D. Van Nostrand, 1929, and in Patents 1,538,964 and 1,557,229, granted to O. J. Zobel.

For satisfactory use in geophysical prospecting, means for measuring the time lapse between one event and another are usually provided. That is, the method of prospecting involves the detonation of an explosive and measuring the time lapse between the instant of explosion and the arrival of a reflected or refracted sound wave.

We prefer to make the total amount of delay available in the delay networks 31, 32, etc., and 51, 52, etc., in the order of 0.010 sec. and 0.100 sec. respectively, although special conditions may necessitate some increase in these values.

In computing the results from records 150 (and 250 when this record is used) it is necessary of course, to consider the delay that has occurred in the delay channels. That is, if trace 253 on record 250 shows an event to have occurred at a time T seconds after the instant of the explosion, the same event will show on some trace of record 150 at a later time, or $T+\Delta T$ seconds after the shot instant, where $\Delta T$ represents a delay of half the total available delay in one of the delay circuits 51—55 plus the average delay in circuits 31—35. Thus in computing sound path lengths from record 150, the time $\Delta T$ must first be deducted.

Obviously, if record 150 runs at the same speed as record 250, events which occur so as to be spaced in a given manner on record 250 will be spaced the same way on record 150, except that the spacing with respect to the shot instant datum will be different. Of course, exact similarity of spacing, even with respect to the shot instant datum could be produced by placing the delays 31—35 ahead of the primary recorder 230, and in addition placing delay circuits in leads 211—215 such that each delay produced is equal to the average delay in circuits 51—55. This would however, merely add to the complexity and bulk of the apparatus, and the work of computation would not be materially lessened.

We therefore prefer the invention in the form represented in Fig. 1, except that in some cases leads 211—215 may follow delays 31, 32, 34 and 35 instead of preceding them.

For depth sounding purposes, the apparatus differs but little from that used in geophysical propecting. Hydrophones are substituted for geophones 11—15, and suspended in the water, mounted in the hull of a ship, or disposed on floats so as to be spaced apart. A source of sound, such as an explosive detonation or intermittent tone generator is provided, preferable with means for recording the shot instant or instant of starting or stopping the intermittent tones. Just as in the method of prospecting, the record 150 provides an immediate measure of depth and slope of the bottom.

The amount of delay available in the main channels 51—55 will ordinarily differ in magnitude from the amount found desirable for prospecting; the frequencies used will depend on the nature of interference encountered and so the design of the delay channels will involve different constants but the same principles. Ordinarily in prospecting the frequencies recorded do not exceed about 200 cycles; in depth sounding supersonic frequencies have been employed. Obviously the oscillograph design must be such that response occurs at the frequency employed.

Sometimes the delay elements 31, 32, 34 and 35 may be omitted entirely, obviating also the use of unilateral networks 41—45. But even for depth sounding, these elements can profitably be included to compensate for a hydrophone placement geometry which is not colinear or to compensate for unequal depths. For example with hydrophones placed along the hull of a ship in a line parallel to the keel, they might be arranged in a colinear array, but still be at different depths due to the manner in which the ship is loaded. Thus the adjustable delays 31, 32, 34 and 35 can be employed to compensate for different conditions of loading such as draughts fore and aft.

The application of the method and apparatus for depth sounding in water can obviously be extended to include sounding in air, as for example finding the altitude of an airplane or airship in flight. Here the distance to and slope of the ground surface can readily be determined by the use of the method and apparatus disclosed. In the appended claims, depth sounding should be interpreted to include this altimetric use.

Figure 6:
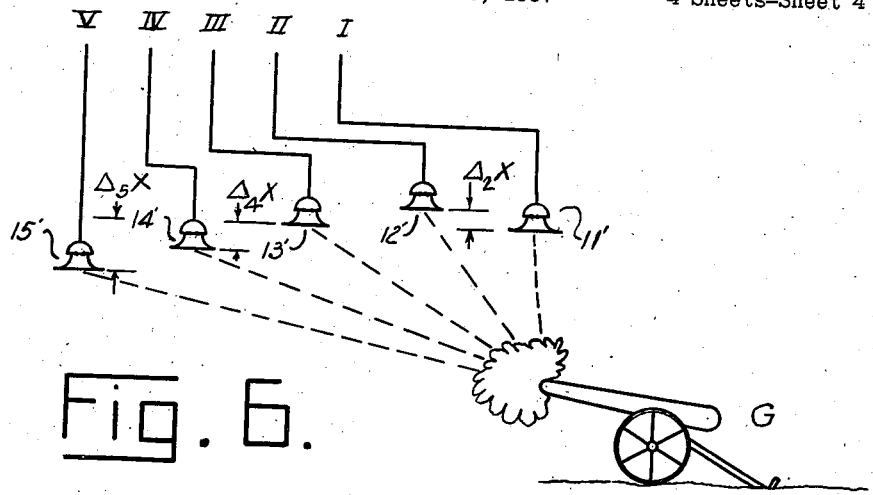

For sound ranging purposes, the apparatus takes a slightly different form yet substantially the same as that above described. Microphones 11'—15' in Fig. 6 are substituted for the geophones 11—15 in Fig. 1 and instead of the shot point SP, a sound source such as the gun G is shown. Sound waves following paths 1', 2'—5' are picked up and passed to channels I—V wherein the apparatus becomes that of Fig. 1, and recording and analysis is the same as in the case of the apparatus for geophysical prospecting.

The analyzed record 150 then provides an immediate measure of direction from which the sounds are arriving, and, as when the equipment is used for prospecting, this record is capable of segregating several sounds arriving from different directions even when such sounds arrive simultaneously at one or more microphones.

Figure 7:
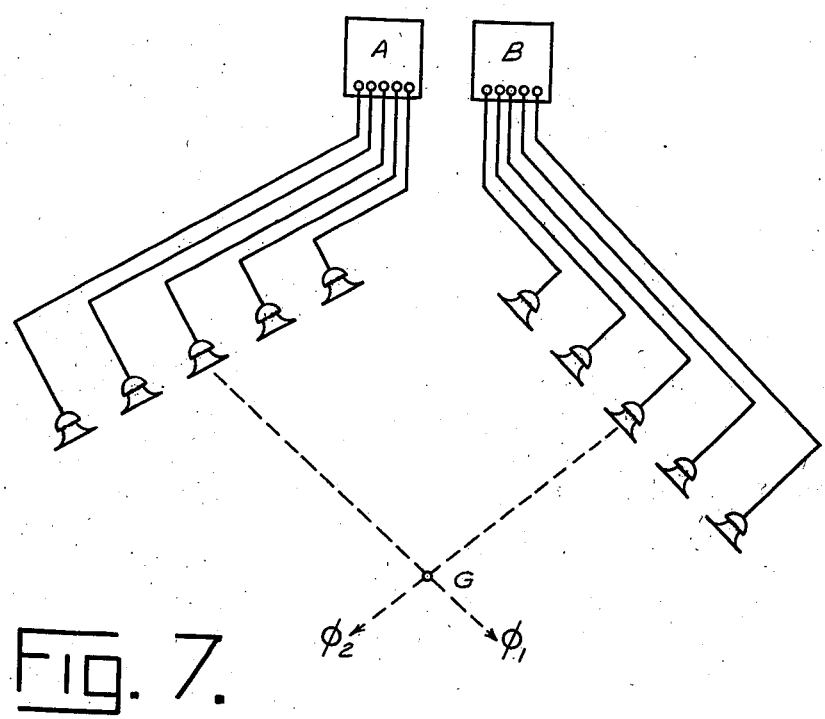
Fig. 7 shows how two separate recorder units can be used for definite location of such sounds, each unit giving information as to direction only, but by triangulation combining to give the complete information necessary to locate the sound source.

As the apparatus so used can best give information as to direction only, it is usually necessary to use two or more complete recording units, spaced apart as shown in Fig. 7, so that the directional information given by each can be combined by triangulation to give the definite location: The angles $\phi_1$ and $\phi_2$ of Fig. 7 can then be plotted on a map to locate gun G.

The amount of delay available in the circuits 31, 32, etc., and 51, 52, etc., will ordinarily be greater than that required for seismic work, and would depend on the distance the microphones are spaced and the range of angles to be expected.

If, due to terrain or other conditions it is found to be impossible to arrange the microphones in a colinear array, the effect may be compensated for in the delay units 31, etc., by varying adjustment 305 in Fig. 2. Thus if spacing is offset distances $\Delta_1 X$, $\Delta_2 X$, etc., compensation can be accomplished by individual adjustments of circuits 31—35.

An important phase of usefulness of the invention, for example in counter-battery, lies in the ability to range, first on an enemy gun, and then on the counter-battery bursts. Wind, refraction, diffration, or reflection of sound may produce errors in ranging the enemy gun, but the same errors will apply in locating the counter-battery bursts and discrepancies between the two locations can be quickly discovered and compensations made.

The muzzle blast and shell bursts are readily distinguished by the different wave forms produced; even different guns and shells can be distinguished from one another, so by locating a given enemy gun, then locating the counter-battery shell bursts, which can be readily distinguished from other sounds, a rapid correction can be made and the target brought within the counter-battery cone of fire.

While the illustrations used have contemplated geophysical prospecting in the earth, and sound ranging in air, it is entirely within the scope of the invention to apply it to sound ranging or depth sounding in water, or for geophysical prospecting where the earth's crust to be explored is covered by a body of water. In such cases, hydrophones would be substituted for geophones or microphones. The hydrophones could be suspended at any desired depth depending on the purpose involved. The direction from which sound waves arrive may then be determined, and geophysical investigations, sound ranging or depth sounding be practised as hereinbefore disclosed.

What is claimed is:

1. A device for locating sources of elastic waves comprising in combination, means for creating elastic waves, a plurality of means for translating the vibrations resulting from said disturbances into recordable impulses, said means being spaced from each other and from the point of origin of said disturbance, means for delaying said impulses in a plurality of primary delay circuits, means for compounding the delayed impulses in a plurality of secondary channels, means for recording the impulses from said secondary channels, and means for additional delay adjustment in each of said primary circuits whereby compensation for local or surface irregularities is provided.

2. The method of locating sources of elastic waves which comprises translating the vibrations from a disturbance into recordable impulses at points spaced from the disturbance, compensating for irregularities by delaying the plurality of impulses by adjustable amounts, further delaying the impulses by predetermined amounts, compounding the delayed impulses and recording the compounded impulses.

3. The method of locating sources of elastic waves which comprises translating the vibrations from a disturbance into recordable impulses at points spaced from the disturbance, recording the impulses, compensating for irregularities by delaying the plurality of impulses by adjustable amounts, further delaying the impulses by predetermined amounts, compounding the delayed impulses and recording the compounded impulses.

4. A sound ranging apparatus for locating sources of wave disturbance comprising in combination, a plurality of means for translating vibrations into recordable impulses, said means being in relative spaced relation from each other, means for compensating for non-linear geometry of said translating means by delaying said impulses by adjustable amounts, means for recording said plurality of impulses, means for delaying said impulses in a plurality of primary delay channels, means for compounding the delayed impulses and means for recording said plurality of compounded combinations whereby the direction of the disturbance may be determined.

5. A sound ranging apparatus for locating sources of wave disturbance comprising in combination, a plurality of means for translating vibrations into electrical impulses, said means being in relative spaced relation from each other, means for recording said plurality of impulses, means for compensating for non-linear geometry of microphone spacing by means for delaying said impulses by adjustable amounts whereby non-linear geometry of said translating means is compensated, means for delaying said impulses, means for compounding the delayed impulses, and means for recording said plurality of compounded combination whereby the direction of the disturbance may be determined.

6. The method of location of sources of elastic wave disturbance comprising detecting the emitted waves at a plurality of points, translating the waves into recordable impulses, recording said impulses, delaying said impulses in a plurality of channels, compounding the resulting delayed impulses and recording the plurality of compounded impulses.

7. The method of sound ranging for location of sources of wave disturbance comprising detecting the emitted waves at a plurality of points, translating the waves into electrical impulses, compensating for non-linear geometry of spacing of the points of translation by delaying said impulses by adjustable amounts, recording said impulses, delaying said impulses, compounding the resulting delayed impulses and recording the plurality of compounded impulses.

8. The method of sound ranging for locating gunfire comprising detecting the emitted waves produced by gunfire, translating the waves into electrical impulses, delaying said impulses, recording the plurality of compounded impulses, firing counter battery rounds, ranging on the resulting counter battery shell bursts and correcting for the errors in the first laying.

9. Apparatus for locating sources of elastic waves comprising a plurality of means for translating the wave impulses into recordable impulses, said means being in spaced relation to each other and to the source, a delay channel connected to each of said translating means, each of said channels having a plurality of connection points, to which the impulses are conducted at different predetermined time lags, a unilateral impedance connected to each of said connection points, compounding circuits connected to the unilateral impedances for combining the delayed impulses in a plurality of combinations, whereby impulses from the translation devices are summed up in one time-phase combination in one such circuit and in different time phase combinations in all other such circuits, and a recorder element connected to each of said compounding circuits.

ESME E. ROSAIRE.
FABIAN M. KANNENSTINE.